No. 620,520. Patented Feb. 28, 1899.
J. J. WELSTEAD.
PNEUMATIC PIPE TESTING PLUG.
(Application filed Dec. 9, 1896.)
(No Model.)
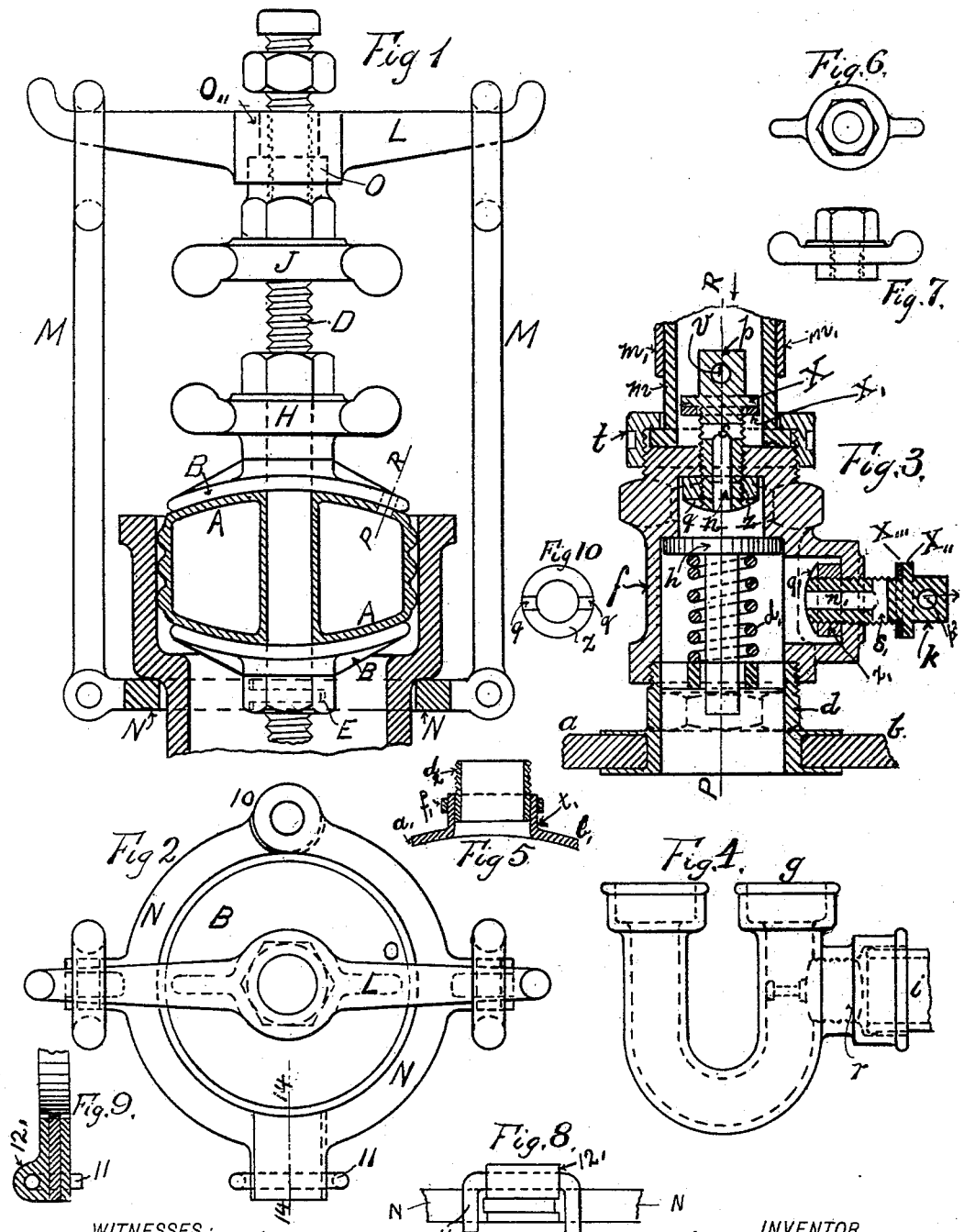
WITNESSES:
Michael J Harris
George Smith
INVENTOR
John Joseph Welstead
BY
Arthur A. de Bonneville
ATTORNEY
THE NORRIS PETERS CO., PHOTO-LITHO., WASHINGTON, D. C.

UNITED STATES PATENT OFFICE.

JOHN JOSEPH WELSTEAD, OF NEW YORK, N. Y.

PNEUMATIC PIPE-TESTING PLUG.

SPECIFICATION forming part of Letters Patent No. 620,520, dated February 28, 1899.

Application filed December 9, 1896. Serial No. 615,058. (No model.)

*To all whom it may concern:*

Be it known that I, JOHN JOSEPH WELSTEAD, a citizen of the United States, and a resident of New York, in the county of New York and State of New York, have invented certain new and useful Pneumatic Pipe-Testing Plugs, of which the following is a specification.

This invention relates to certain new and useful improvements in pipe-testing plugs, and has for its object the production of a simple, durable, effective, and inexpensive device for temporarily securely plugging the open end or ends of a pipe or pipe system while testing the same by pressure.

To these ends, therefore, my said invention consists in an inflatable vessel adapted to be secured in the end of the pipe or pipe system, in means for securely holding said vessel in position, and in the details of construction and the arrangement and combination of parts, all as hereinafter more fully described, and pointed out in the claims.

Referring to the accompanying drawings, forming part hereof, in the several figures of which like parts are similarly designated, Figure 1 is an elevation of my invention, partly in section and showing the same clamped in position in a pipe end. Fig. 2 is a top plan view of the same. Fig. 3 is an enlarged vertical sectional view of the air-admission, check, and relief valve. Fig. 4 illustrates one method of using my invention; and Figs. 5, 6, 7, 8, 9, and 10 illustrate details of construction.

A represents the plug proper, the same comprising a hollow inflatable vessel, preferably of rubber or other elastic material, and, if desired, reinforced at one or more points by linen, canvas, or other fibrous material, and also, if desired, formed with side corrugations, as shown. The heads of said plug, as shown in Fig. 1, are confined between the washers or caps B B by the screw-threaded pipe or rod D passing through said washers and through a tubular central passage in the plug A and held in position by the nuts E and H. The nut H is a combination wing and hexagon nut, of which a plan is shown in Fig. 6 and an elevation in Fig. 7, the function thereof being not only to hold the plug between the washers, but also to slightly distend said plug laterally upon placing the same in operative position, which is accomplished by turning said nut either by hand or with a wrench or special tool. Also working on the pipe or rod D is the wing and hexagon nut J, having an upper reduced extension forming a bearing for the cross-head L, from which depend the links or hangers M M, hinged or otherwise attached to the ring-clamp N. Said cross-head is drilled at O″ to easily work over the pipe or rod D and is counterbored at O to form a shoulder for the cylindrical upper extension of nut J, thus preventing the cross-head from touching or injuring the threads on rod D.

The ring-clamp N is made in two pieces hinged together at 10 and may be used on the bell or spigot end of a pipe. The opposite ends are made to engage each other, as by channeling one end and reducing the other, to fit in said channel, as shown in section in Fig. 9, said section being taken on the line 14 14, Fig. 2, when the parts may be confined, as by the U-shaped catch or clasp 11, adapted to swing in lug 12 on the channel portion of the clamp and to embrace the male and female members thereof, as in Figs. 8 and 9.

The check-valve chamber and coupling (shown greatly enlarged in Fig. 3) is part of my pneumatic pipe-testing plug, and is not shown in Fig. 1 to avoid confusion.

The valve-chamber $f$ is secured to the plug A at some convenient point—as, for example, through the opening P R in Fig. 1.

Referring to Fig. 3, $a\ b$ indicate a fragment of the top head of plug A, in which a nipple $d$ is secured, either as shown in said figure or as in Fig. 5, where $a'\ b'$ indicate a fragmentary section of the plug, having the throat or elongation $t'$, in which the nipple $d^2$ is inserted and firmly held by the band or collar $f'$. Mounted on said nipple is the chamber $f$, containing the check-valve $h$, which comprises a disk with a central stem, held against a seat in the chamber $f$ by a helical spring $d'$. Secured to the top of chamber $f$ is a nipple $m$, over which fits the pipe or hose $m'$, leading to a suitable source of pressure, and said nipple is held tightly in position by the nut $t$. Screwed into the top of the chamber $f$ and extending into the nipple $m'$ is a safety plug-valve $p$, through which when it is in the position shown the pressure is forced, entering the transverse ports or passages *s*, which communicate with the longitudinal passage or port *n*. The projecting head of valve *p* is preferably capped by a collar X and squared head, as shown, beneath which is arranged the washer X', and at the lower end of the valve is the nut Z, slotted across its lower face, as shown in Fig. 3 and also in plan in Fig. 10, said nut preventing the valve from being screwed out of place or moved beyond operative position. When the pressure introduced to plug A through pipe *m'*, nipple *m*, plug-valve *p*, chamber *f*, and nipple *d* is sufficient, the nut *t* may be loosened and the hose *m'*, with its nipple *m* and nut *t*, be removed and the plug-valve *p* screwed down by a wrench or a pin passed through a hole V in the square head until the washer X' finds a seat on the top of chamber *f*, thus insuring against any loss of pressure which might escape through the check-valve *h*.

A relief-valve *k*, in all respects similar to the valve *p*, is arranged in the side of valve-chamber *f*. Said valve has the longitudinal and cross ports *n' s'*, the collar X'', washer X''', the slotted nut Z', and the squared head having the opening $p^2$. When plug A is being charged and during the test, valve *k* is of course screwed in as far as possible. When the operation is completed and it is desired to withdraw plug A, the valve *k* is opened to the position shown, when the pressure will escape through ports *n'* and *s'*.

The combination of coupling, check-valve, adjustable inlet-valve, and outlet-valve, all as shown in Fig. 3, instead of being directly attached to the testing-plug may be secured to a piece of hose and the piece of hose coupled to the testing-plug.

When testing near a trap, my testing-plug is applied as shown in Fig. 4. The plug is inserted into pipe leading from the trap, as at *r*, with the pipe or rod passing through the plug abutting against one of the inner walls of the trap. The cross-head, links, and ring-clamps being dispensed with, the plug is inflated through valve-chamber, as illustrated in Fig. 3, distending the plug against the side of the pipe, and also held against displacement by the engagement of rod or pipe through the plug with the wall of the trap.

From an examination of my invention it will be evident that a positive mechanical connection between the plug and the pipe to be tested is obtained in addition to securing the plug in position by its internal pressure, thus obviating any danger of the plug blowing out or being displaced during the test. It will also be observed that by confining the plug between the caps or washers B B the pressure on inflation is all lateral and against the walls of the pipe; also, that by turning nut H just prior to inflation the plug is slightly laterally distended, thereby preventing the plug from being distended beyond its elastic limit upon being charged.

What I claim, and desire to secure by Letters Patent, is—

1. In a pipe-testing plug, a hollow annular vessel of pliable material adapted to be extended by fluid-pressure, and a ring clamping or holding device and connections thereof with said vessel for maintaining said vessel in operative position, on the bell or spigot end of a pipe, when pressure in tested piping is less, equal, or exceeds the fluid-pressure in testing-plug.

2. In a pipe-testing plug, a hollow annular vessel of pliable material adapted to be laterally extended by air-pressure, a clamping device and connections thereof with said vessel adapted to hold the opposite heads of said vessel against longitudinal displacement, in combination with a ring-clamp, to secure said vessel in operative position on the bell or spigot end of a pipe, irrespective of the relative pressures, in tested piping, and pipe-testing plug, substantially as described.

3. A hollow annular vessel of pliable material adapted to be extended by air-pressure, washers or plates, engaging the opposite heads of said vessel, and a ring-clamp and connections thereof with said vessel for securing said vessel, and washers in operative position, on the bell or spigot end of a pipe, substantially as described.

4. A hollow annular vessel of pliable material, adapted to be extended by air-pressure; a pipe partially screw-threaded passing through the central opening of said vessel and carrying washers or plates abutting against the opposite heads thereof, and ring-clamps for securing the said device in operative position, on the bell or spigot end of a pipe, substantially as described.

5. A hollow annular vessel of pliable material, adapted to be extended by air-pressure; a pipe partially screw-threaded passing through the central opening of said vessel, and carrying washers or plates abutting against the opposite heads thereof; a cross-head working over said pipe, a separable ring adapted to be clamped about the pipe to be plugged; links or hangers extending between said ring and cross-head, and a nut on the pipe adapted to regulate the position of the cross-head substantially as described.

6. A hollow annular vessel of pliable material, adapted to be extended by air-pressure; a pipe passing through the central opening in said vessel, and carrying washers or plates abutting against the opposite heads thereof; a cross-head working over said pipe; a separable ring adapted to be clamped about the pipe to be plugged; links or hangers extending between said ring and cross-head; a nut working on said pipe, and adapted to regulate the position of the cross-head, and nuts also working on said pipe, adapted to compress the vessel between the washers or plates, substantially as described.

7. In a pipe-testing plug; a hollow annular vessel adapted to be extended by air-pressure, in combination with inlet and outlet valves, and means to prevent said valves being placed beyond operative position, substantially as described.

8. In a pipe-testing plug; a hollow annular vessel adapted to be extended by air-pressure, in combination with a check-valve, inlet and outlet valves, constructed to avoid being placed beyond operative position, substantially as described.

9. A hollow vessel adapted to be extended by fluid-pressure in combination with a check-valve, and an adjustable inlet-valve, with means to prevent said inlet-valve being moved beyond operative position, substantially as described.

10. The combination of a U-bolt as shown at 11 with ring-clamp N, N, of a pipe-testing plug, substantially as described.

11. The combination of a coupling, check-valve $h$, adjustable inlet-valve $p$, adjustable outlet-valve $k$, with a pneumatic pipe-testing plug.

12. A hollow vessel adapted to be extended by air-pressure in combination with an automatic check-valve $h$; adjustable inlet-valve $p$, and outlet-valve $k$, constructed to avoid being moved beyond operative position substantially as described.

13. A hollow vessel adapted to be extended by air-pressure in combination with a check-valve $h$, and an adjustable inlet-valve $p$, adapted to be screwed to its seat to prevent leakage of air escaping through check-valve, and means to prevent inlet-valve being moved beyond operative position.

14. A hollow vessel adapted to be extended by air-pressure in combination with a check-valve, an inlet-valve having a port partly through its longitudinal axis, and a through-port at right angles, said inlet-valve having a collar to adapt it to be firmly secured to its seat, and means to prevent it being moved beyond operative position substantially as described.

15. The combination with a hollow expandible vessel, of a check-valve, inlet and outlet valves each with axial and transverse ports and collar, washer and nut, to firmly secure said inlet and outlet valves to their seats and means to prevent them being moved beyond operative position, substantially as described.

16. A hollow expandible vessel, inlet-valve and check-valve, with means for clamping said vessel in operative position on the bell or spigot end of a pipe, irrespective of the relative pressures in hollow expandible vessel, and pipe to be tested, substantially as described.

17. An annular expandible vessel, a check-valve, inlet and outlet valves with means for clamping said vessel in operative position, on the bell or spigot end of a pipe, irrespective of the relative pressures in expandible ring and pipe to be tested, substantially as described.

18. An annular hollow testing-plug A, pipe D, wing-nuts H and J, washers B, B, cross-head L, links or hangers M, M, ring-clamps N, N, in combination with check-valve chamber $f$, check-valve $h$, inlet-valve $p$, and outlet-valve $k$, substantially as described.

19. An annular hollow testing-plug A, pipe D, wing-nuts H and J, washers B, B, in combination with check-valve chamber $f$, check-valve $h$, inlet-valve $p$, and outlet-valve $k$, substantially as described.

Signed at New York, in the county of New York and State of New York, this 28th day of November, A. D. 1896.

JOHN JOSEPH WELSTEAD.

Witnesses:
JOE G. ENGEL,
OSCAR ENGLANDER.